United States Patent [19]

Anderson

[11] 4,083,817

[45] Apr. 11, 1978

[54] BLENDS OF FURAN-ALDEHYDE RESINS WITH PHENOLIC RESINS AND MOLDED ARTICLES PRODUCED THEREFROM

[75] Inventor: Hugh C. Anderson, Palatine, Ill.

[73] Assignee: The Quaker Oats Company, Chicago, Ill.

[21] Appl. No.: 806,661

[22] Filed: Jun. 15, 1977

[51] Int. Cl.² ............................................. C08L 45/00
[52] U.S. Cl. ...................................... 260/38; 164/43; 260/829
[58] Field of Search ................................. 260/38, 829

[56] References Cited

U.S. PATENT DOCUMENTS

| | | | |
|---|---|---|---|
| 3,361,841 | 1/1968 | Lorentz | 260/38 |
| 4,017,461 | 4/1977 | Dunlop et al. | 260/67 F |

Primary Examiner—S. M. Person
Attorney, Agent, or Firm—Joseph P. O'Halloran

[57] ABSTRACT

This invention relates to curing of furan-formaldehyde resins with phenolic resole resins under acidic conditions, and relates to the application of this method to the formation of foundry sand shapes, for example.

14 Claims, No Drawings

BLENDS OF FURAN-ALDEHYDE RESINS WITH PHENOLIC RESINS AND MOLDED ARTICLES PRODUCED THEREFROM

BACKGROUND OF THE INVENTION

The reaction of phenol with formaldehyde are well known in the art. Basically there are two types of phenolic resins — the resoles and the novolacs formed by basic and acidic catalysis, respectively. When the phenol-formaldehyde reaction is catalyzed with a base, and the mixture contains one or more than one mole of formaldehyde per mole of phenol, the result is a one step resin, called a resole. This reaction can be summarized by the following equations:

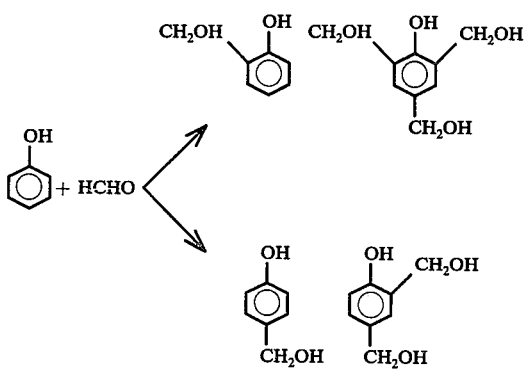

Such mixture of phenolic alcohols are widely known and used, and are referred to as "resoles". Upon further heating these alcohols, the "resoles" tend to polymerize to form a phenolic resin.

On the other hand, the result of an acid catalyzed reaction of less than one mole of aldehyde per mole of phenol is a "novolac" resin, of the following formula:

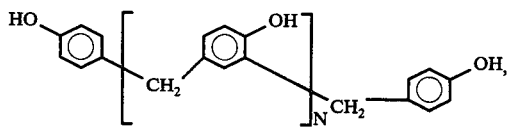

wherein the resin is a mixture of such molecules, and wherein, in respective molecules, N is zero or an integer. The cure of novolac resins is usually carried out by reaction of the resins with hexamethylenetetraamine. However, resoles can be used to cross link novolacs.

The use of furfuryl alcohol as a polycondensate for both resoles and novolacs is well known, as illustrated by U.S. Pat. No. 3,312,650 issued to Arthur Case and Royden Rinker and U.S. Pat. No. 3,299,167 issued to Paul D. Knowlson and Elliot W. Simpson.

However, the present invention relates to the curing of furan-formaldehyde resins with resoles under acidic conditions. The term "furan-formaldehyde resin" referred to herein are those that may be formed, for example, by the reaction of an alpha-unsubstituted furan, such as furan itself, with formaldehyde as disclosed in U.S. Pat. No. 4,017,461 issued on Apr. 12, 1977, to Andrew P. Dunlop and Rudy F. Macander. They have the following chemical structure:

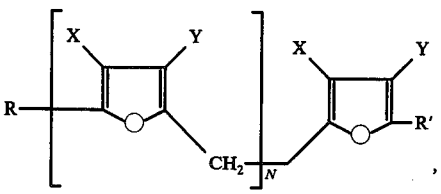

wherein X and Y may be alike or different, and include hydrogen, halogen, alkyl, phenol, alkyl-substituted phenol, halogen substituted phenol, hydroxy alkyl, carboxy alkyl, in which the alkyl substituents have from one to 10 carbons, and wherein R and R' includes hydrogen, or hydroxymethyl. When very large excess of furan is used and upon complete reaction of the available formaldehyde in the Dunlop-Macander reaction referred to above, R and R' are predominantly hydrogen, and wherein N is an integer, at least one. When only a slight excess of furan is used in the Dunlop-Macander reaction, R and R' will include greater amounts of hydroxymethyl termination in the resin. Such resins range in viscosity from about 50 cps to more than 100,000 cps with increasing N value and, typically, with increasing levels of hydroxymethyl. The resins are mixes of molecules having different values of N. We have discovered that in accordance with the present invention these resins couple with phenolic resins of the resole type under acidic catalysis conditions. The acids useful as catalysts in accordance with the present invention, include any strong acid. However, the aromatic sulfonic acids are most preferred for use as catalyst in accordance with the present invention.

The liquid catalyst resole-furan formaldehyde resin reaction mixtures in accordance with the present invention are useful as liquid, hardenable binders for use with glass fibers, foundry sand, etc., in the manufacture of composite articles, for example. When sand or glass-fiber is bound with the liquid resole-furan formaldehyde resin reaction mixtures in accordance with the present invention, it is preferred that a silane be included as an ingredient in the binder mixture.

Silanes useful in accordance with the present invention can be any organo silicon compound referred to in U.S. Pat. No. 3,737,430 to Brown, et al. In addition other specific examples include the following:
gamma-mercaptopropyltrimethoxysilane
N-beta-(aminoethyl)-gamma-aminopropyltrimethoxysilane
beta-(3,4-epoxycyclohexyl)ethyltrimethoxysilane
gamma-glycidoxypropyltrimethoxysilane
gamma-aminopropyltriphenoxysilane
gamma-aminopropyltribenzoxysilane
gamma-aminopropyltrifurfuroxysilane
gamma-aminopropyltri(o-chlorophenoxy)silane
gamma-aminopropyltri(p-chlorophenoxy)silane, and
gamma-aminopropyltri(tetrahydrofurfuroxy)silane
methyl[2-(gamma-triethoxysilypropyl-amino)ethyl amino]3-propionate in methanol
modified amino-organosilane
Ureido-silane
mercaptoethyltriethoxysilane
chloropropyltrimethoxysilane
vinyltrichlorosilane
vinyltriethoxysilane
vinyltrimethoxysilane
gamma-methacryloxypropyltrimethoxysilane gamma-methacryloxypropyltri(2-methoxyethoxy)silane
vinyltriacetoxysilane
gamma-aminopropyltriethoxysilane The list of commercially available and recognized composite article adhesion promoters is lengthening as further research and development continues, and it is expected that any commercially available adhesion promoter is useful to advantage as an ingredient with the resole-furan formaldehyde binder system in accordance with the present invention.

It is contemplated that any phenolic resin of the resole type is useful in accordance with the present invention. We have chosen to describe the use of several commercially available resoles for the purpose of illustrating the invention, and for the purpose of setting forth what presently is regarded as the best mode.

It is also contemplated, that the liquid resin which results from less than completion of the coupling reaction is useful as a binder for producing foundry sand shapes. The examples that follow will also illustrate this contemplated use.

In the following examples all parts are expressed in parts by weight, all temperatures are expressed in degree centigrade, and all percents are expressed in percent by weight based on 100 parts by weight of the material then being referred to.

EXAMPLE 1

This example is intended to illustrate the reaction of a furan-formaldehyde resin with a commercially available phenolic no-bake resole. The furan resin was prepared by reaction of furan and formaldehyde in a 4:1 molar ratio in the presence of oxalic acid heated at 100° C. for 2 hours. This mode of preparation is in accordance with the procedure outlined in the above mentioned Dunlop-Macander patent. The resulting furan-formaldehyde resin had a viscosity of approximately 100 cps at room temperature. A commercially available resole, IMC Self-Set 130 (T.M. of IMC Foundry Products) (22.5 parts) and the furan-formaldehyde resin referred to above (7.5 parts) were admixed. IMC Self-Set 130 is a phenolic no-bake resole containing 15.6 percent free phenol, 15.4 percent water, and having a viscosity of 210 cps. To this mixture 2.4 parts of 75 percent solution of benzene sulfonic acid was added. In 3 minutes, the solution polymerized exothermically to a hard solid.

EXAMPLE 2

The purpose of this example is to illustrate another variation of useful concentrations of ingredients in accordance with the present invention. IMC Self-Set 130 (7.5 parts) and the furan-formaldehyde resin produced in accordance with Example 1 (22.5 grams) were admixed. To this mixture 2.4 grams of 75 percent benzene sulfonic acid was added. In six minutes the solution polymerized exothermically into a hard solid.

EXAMPLE 3

This example is used to illustrate the contemplated use of a liquid resinous material prepared in accordance with the present invention, as outlined in the method of Example 1, as a foundry binder in the preparation of a hardened foundry shape. The tensile strengths at various humidity levels and the bench life were measured using various ratios of phenolic no-bake binder (resoles) to furan-formaldehyde resin. The results are tabulated in Table I.

Foundry sand (3000 parts), toluene sulfonic acid (65 percent solution in water, 30 percent based on the weight of the binder) were admixed by mulling to achieve a uniform distribution of the acid on the sand.

The binder, consisting of an admixture of furan-formaldehyde resin prepared in accordance with the procedure described in Example 1 and the phenolic nobake binder identified as IMC Self-Set 130 referred to in Example 1, is prepared using various ratios set forth in Table I. In each test, 0.15 percent of A1160 silane (T.M. of Union Carbide Corporation) a Ureido silane (50 percent in methanol) based on the weight of the binder, is added as an adhesion promoter, except as otherwise indicated in Table I.

The binder is then admixed with the acid catalyst-sand mix, and at the point where the binder is uniformly distributed in the sand mix, the resulting mixture is subjected to a bench life determination. Simultaneously tensile test specimen biscuits (1 inch cross section) are prepared. The bench life is determined by the use of a Dietert sand rammer. The bench life is arbitrarily determined as the time at which the number of rams required to reach the preset volume is double the number of rams initially required to reach that volume. The tensile strengths are run after overnight storage at the stated relative humidities set forth in the table. The tensile strength number as set forth in Table I represents an average of 24 determinations, in each instance.

The results of these tests, as indicated in Table I, show that even though this particular Dunlop-Macander resin does not readily cure in the presence of acid, usable tensile strengths were obtained in each of the various runs which were in accordance with the present invention, at both ambient and high relative humidities. It is noted that test 1—1 is not in accordance with this invention, but that test 1-2, test 1-3, and test 1-4 are in accordance with this invention.

TABLE I

| | Self-Set 130 Furan-Formaldehyde Resin [1] | | | |
| Test No. | Resole/Resin Weight Ratio | Tensile Strength (psi) | | Bench Life (Min.) |
| | | 68% R.H. | 80% R.H. | |
| --- | --- | --- | --- | --- |
| 3-1 | 0/100 | 0 | 0 | 124 |
| 3-2 | 25/75 | 182 | 120 | 38 |
| 3-3 | 50/50 (without silane) | 182 | 76 | 22 |
| 3-4 | 50/50 | 274 | 218 | 24 |

[1] 1.5 percent binder on sand.

EXAMPLE 4

The purpose of this example is to illustrate the results which occur when the concentration of phenol furan-formaldehyde resin prepared in accordance with the method set forth in Example 1 is varied with respect to another commercially available phenol resole resin. The method as set forth in Example 3 was used, however, and the phenolic resole used in admixture with the furan-formaldehyde resin was Chem Set 700-P (T.M. of Thiem Corporation). Chem Set 700-P is reported to include 14–17 percent water, 1.4 percent of free formaldehyde, and 12.7 percent of free phenol. The furan-formaldlehyde resin-phenolic resole binder mixture in accordance with the present invention is used at the level of 1.5 percent based on the weight of the sand. The results of the tests on the sand mixture are shown in Table II.

TABLE II

| | Chem-Set 700-P/Resin [1] | | | | |
|---|---|---|---|---|---|
| Ratio of 700-P/ Furan Resin | 20/80 | 30/70 | 40/60 | 50/50 | 70/30 |
| Bench Life (Min.) | 50 | 40 | 31 | 33 | 30 |
| Tensile Strength at 56–68% R.H. (psi) | 150 | 260 | 330 | 375 | 305 |
| Tensile Strength at 83% R.H. (psi) | 80 | 205 | 255 | 290 | 220 |

[1]1.5 percent binder on sand.

EXAMPLE 5

This example is intended to show the results of varying the concentrations of furan-formaldehyde resin prepared in accordance with the method set forth in Example 1 to another phenolic resole resin. Again, the method as outlined in Example 2 was used, however, in this instance the phenolic resole resin was Chem-Rez 480 (T.M. of Ashland Chemical Company). The Chem-Rez 480 is reported to contain 4.5 percent free phenol, 15.4 percent water and has a viscosity of 530 cps. at ambient temperature.

TABLE III

| | Ashland 480 Binder/Resin [1] | | | | | |
|---|---|---|---|---|---|---|
| Binder Ratio of Ashland 480/ Furan Resin | 90/10 | 20/80 | 30/70 | 40/60 | 50/50 | 70/30 |
| Bench Life (Mins.) | 60 | 33 | 23 | 12 | 15 | 14 |
| Tensile Strength at 42–64% R.H. (psi) | 95 | 195 | 215 | 310 | 325 | 260 |
| Tensile Strength at 86% R.H. (psi) | 30 | 100 | 175 | 245 | 260 | 250 |

[1]1.5 percent binder on sand.

From the foregoing general discussion, and specific examples which include the best mode of practicing the invention contemplated at this time, it is apparent that furan-formaldehyde resins, including those which do not cure readily under acidic conditions, are indeed readily cured in the presence of phenol resole resins in the presence of an acid catalyst. It is also apparent that the method in accordance with the present invention provides useful process for producing composite articles such as, for example, resin bound glass and sand articles including foundry sand shapes, for example.

Therefore, I claim:

1. A composition comprising: a liquid mixture of
   (a) a liquid furan-formaldehyde resin formed by acidic polymerization of a furan-formaldehyde mixture in which an excess of furan is maintained, and
   (b) a liquid phenolic resole resin.

2. The composition of claim 1 in which said resole resin is present in the mixture in an amount between 5 and 50 percent by weight.

3. The composition of claim 1 in which said mixture includes a silane.

4. The method of curing a furan-formaldehyde resin produced by the acid condensation of furan and formaldehyde under conditions such that an excess of furan is maintained at all times, which method comprises the steps:
   admixing said furan-formaldehyde resin with a phenol resole resin in an amount sufficient to provide from 5 percent to 50 percent resole based on the weight of the resulting mixture, and contacting said mixture with a strong acid.

5. The method of claim 4 which includes the step of adding a silane to the furan-formaldehyde phenolic resole mixture.

6. The method of making composite articles wherein a solid material such as glass fiber or sand is shaped into a solid resin-bound article, comprising the steps:
   (a) forming a binder by admixing a liquid phenolic resole resin and a liquid furan-formaldehyde resin produced by the acid condensation of furan-formaldehyde under conditions in which an excess of furan is maintained;
   (b) admixing said binder with an acid catalyzed solid material, said binder being used in amounts between 0.5 and 4 percent by weight;
   (c) shaping the resulting binder-catalyzed solid material mixture, and
   (d) permitting the resulting shaped mass to remain in said shape for a period of time sufficient for the binder to harden.

7. The method of claim 6, which includes adding a silane to said binder prior to admixture of said binder with the acid catalyzed solid material.

8. A composition comprising: a liquid mixture of
   (a) a liquid phenolic resole resin and
   (b) a liquid furan-formaldehyde resin formed by acidic polymerization of a furan-formaldehyde mixture in which an excess of furan is maintained, said liquid furan-formaldehyde resin having the following chemical structure:

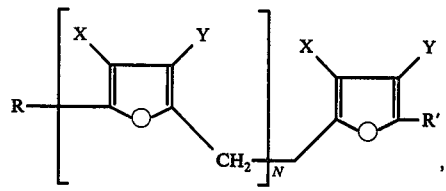

wherein X and Y may be alike or different, and include hydrogen, halogen, alkyl, phenol, alkylsubstituted phenol, halogen substituted phenol, hydroxyalkyl, carboxyalkyl, in which the alkyl substituents have from 1 to 10 carbons, and wherein R and R' includes hydrogen and/or hydroxymethyl, and wherein N is an integer at least one.

9. The composition of claim 8 in which said resole resin in present in the mixture in an amount between 5 and 50 percent by weight.

10. The composition of claim 8 in which said mixture includes a silane.

11. The method of curing a liquid furan-formaldehyde resin produced by the acidic condensation of a furan and formaldehyde under conditions such that an excess of the furan is maintained at all times, said liquid furan-formaldehyde resin having the following chemical structure:

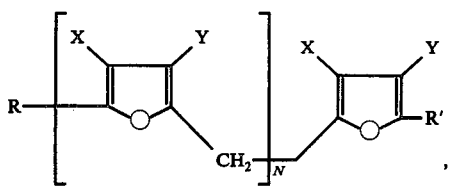

wherein X and Y may be alike or different, and include hydrogen, halogen, alkyl, phenol, alkyl substituted phenol, halogen substituted phenol, hydroxyalkyl, carboxyalkyl, in which the alkyl substituents have from 1 to 10 carbons, wherein R and R' includes hydrogen or hydroxymethyl, and wherein N is equal to at least one, which method comprises the steps:
  admixing said furan-formaldehyde resin with a liquid phenol resole resin in an amount sufficient to provide from 5 to 50 percent resole based on the weight of the resulting mixture, and contacting said mixture with a strong mold.

12. The method of claim 11 which includes the step of adding a silane to the furan-formaldehyde phenolic resole mixture.

13. The method of making composite articles wherein a solid material such as glass fiber or sand is shaped into a solid resin-bound article, said method comprising the steps:
  (a) forming a liquid binder by admixing a liquid phenolic resin and a liquid furan-formaldehyde resin, the liquid furan-formaldehyde resin having been produced by the acid condensation of furan-formaldehyde under conditions in which an excess of furan is maintained, said furan-formaldehyde resin having the following chemical structure:

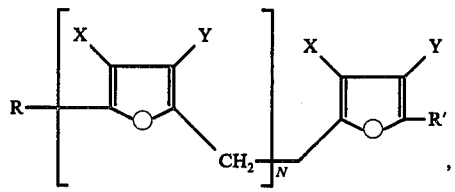

wherein X and Y may be alike or different, and include hydrogen, halogen, alkyl, phenol, alkyl substituted phenol, halogen substituted phenol, hydroxyalkyl, carboxyalkyl, in which the alkyl substituents have from 1 to 10 carbons, wherein R and R' includes hydrogen, or hydroxymethyl, and where N is an integer at least one,
  (b) admixing said binder with an acid catalyzed solid material, said binder being used in amounts between 0.5 and 4 percent by weight,
  (c) shaping the resulting binder-catalyzed solid material mixture, and
  (d) permitting the resulting shaped mass to remain in such shape for a period of time sufficient for the binder to harden.

14. The method of claim 13 which includes adding a silane to said binder prior to admixture of said binder with the acid catalyzed solid material.

* * * * *